F. C. WARNE.
DISK HARROW.
APPLICATION FILED FEB. 12, 1915.
1,192,023.
Patented July 25, 1916.
2 SHEETS—SHEET 1.
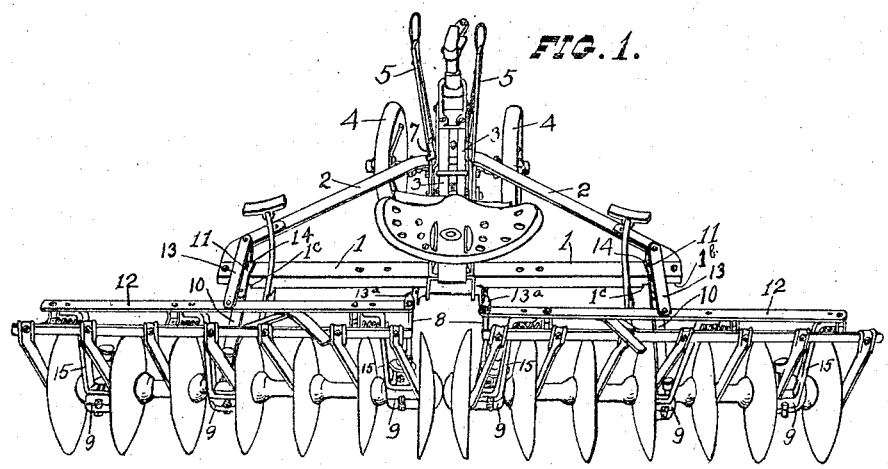
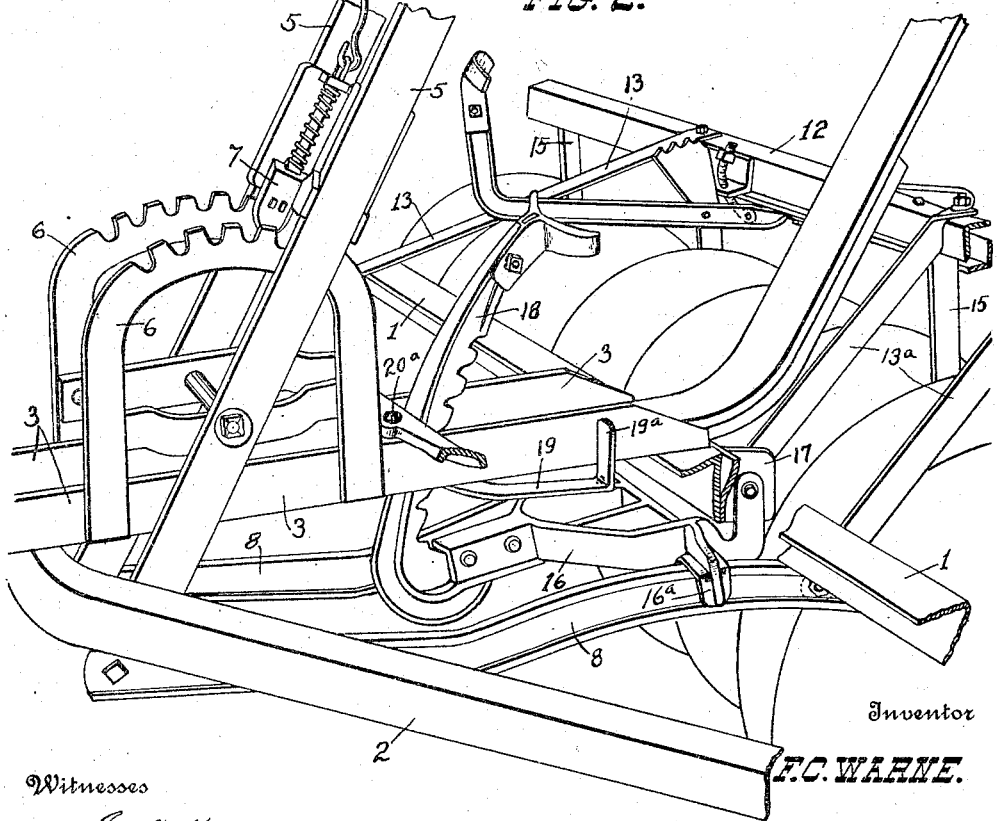

F. C. WARNE.
DISK HARROW.
APPLICATION FILED FEB. 12, 1915.
1,192,023.
Patented July 25, 1916.
2 SHEETS—SHEET 2.
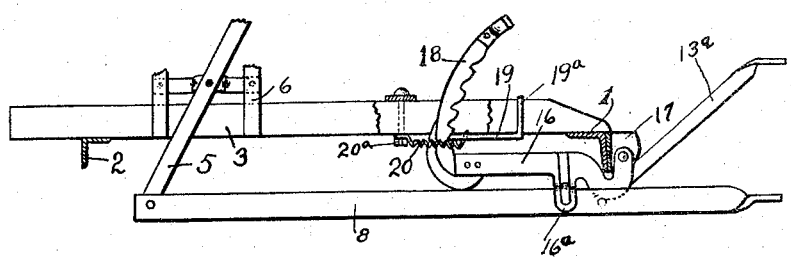
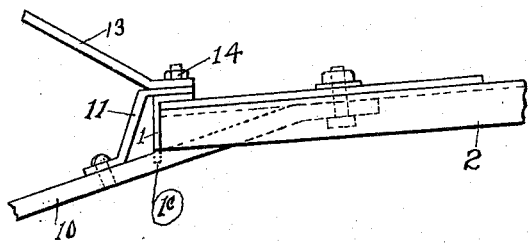
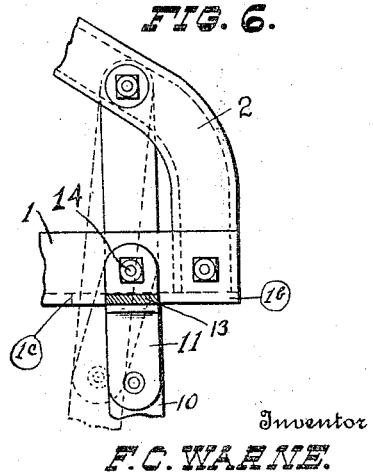
Inventor
F. C. WARNE.
Witnesses
Geo. E. Kricker.
F. C. Adams.
By Fred C. Billman
Attorney

UNITED STATES PATENT OFFICE.

FREDERICK C. WARNE, OF MANSFIELD, OHIO, ASSIGNOR TO RODERICK LEAN MANUFACTURING COMPANY, OF MANSFIELD, OHIO, A CORPORATION OF NEW JERSEY.

DISK HARROW.

1,192,023. Specification of Letters Patent. Patented July 25, 1916.

Original application filed June 20, 1914, Serial No. 846,225. Divided and this application filed February 12, 1915. Serial No. 7,701.

*To all whom it may concern:*

Be it known that I, FREDERICK C. WARNE, a citizen of the United States, residing at Mansfield, in the county of Richland and State of Ohio, have invented certain new and useful Improvements in Disk Harrows, of which the following is a specification.

My invention relates to improvements in disk harrows of the pivoted gang type, the invention of the present application relating to an improved draft frame and means for connecting such draft frame with the gang frames and disk gangs, together with an improved foot controlled disk gang regulating or leveling device for use in such connection such as shown and described in my application filed June 20, 1914, Serial No. 846,225, and of which this application is a divisional part.

The primary object of the invention is to provide a generally improved draft frame and means for connecting such draft frame with the gang frames and disk gangs whereby the latter are free to be adjusted at any desired angle of incidence relative to the line of draft and are also adapted to be moved laterally toward or from such line of draft through the medium of suitable pivotal connections with the draft frame, one object being to make such connections substantially rigid as against any tendency of the draft frame to rise or fall relative to the gang frames.

Another object is to provide an improved foot controlled disk gang regulating and leveling device for use in connection with such draft frame whereby the draft bars and the inner ends of the disk gangs may be simultaneously adjusted or depressed in any of the various adjusted positions of the disk gangs to the line of draft, this function being performed through the medium of the leveling or snubbing block interposed between the draft bars and the draft frame and provided with an improved upwardly extending foot lever and mechanism for securing the latter in any desired adjusted position.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a rear top view of a disk harrow constructed in accordance with this invention, showing the position of the parts prior to the adjustment of the disk gangs to their angular position or relation to each other in operative use in cultivating the soil. Fig. 2, an isometric view of the draft frame and its connections, looking downwardly from in front of and at one side thereof and illustrating more particularly the improved foot controlled disk gang regulating and leveling device. Fig. 3, a detached view, partly in side elevation and partly in central longitudinal section through the draft frame, and illustrating more particularly the disk gang leveling device and the connections between the latter and the stub pole and adjustable draft bars leading to the inner ends of the disk gangs. Fig. 4, a fragmentary side elevation of the draft and brace bar connections at one side of the improved draft frame. Fig. 5, a fragmentary rear view of the same. Fig. 6, a fragmentary top plan view of the same.

Similar numerals of reference designate like parts throughout all the figures of the drawings.

The improved disk harrow comprises a draft frame consisting, in the present instance, of a transverse bar 1, and a curved draft frame member 2, the latter having its forward middle portion secured to a stub pole 3, which latter is made up of spaced angle bars secured at their rear to the transverse bar or member 1, said stub pole being adapted to receive a fore-truck 4, as shown, or other suitable draft appliance. The stub pole 3, is provided with a set of pivotally mounted vertically extending levers 5, and suitable coöperating sector racks 6, the lower ends of said levers being connected to draft bars 8, the latter having their rear ends flexibly or pivotally attached to bearing or axle boxes 9, at the inner ends of the front disk gangs whereby the latter may be given the desired angle with respect to each other as well as relative to the line of draft.

As a means of connecting the draft frame to the disk gangs, draft bars 10, are pivotally connected to the under outer portions of the curved frame member 8, (see Fig. 4) and in front of the transverse bar 1, said draft bars extending rearwardly beneath the latter and being flexibly connected to axle boxes 9, at or near the centers of the disk gangs, and as a means of limiting the lateral movements of the draft bars 8, the under side portions of the transverse bar 1, are provided with cut-away portions 1$^b$, providing stop shoulders 1$^c$, as shown most clearly in Figs. 4 and 5 of the drawings. As a means of supporting and maintaining the draft bars 10, in proper relative position to the transverse bar 1, the latter are provided with supporting clips 11, adapted to be moved horizontally and laterally as indicated by dotted lines in Fig. 6, said clips being pivotally connected to the top portion of the draft bars 10, and at the rear of the transverse bar 1, and as a means of flexibly connecting the draft frame to the upper or transverse bars 12, of the disk gang frames, brace members 13, are provided, the latter extending upwardly and rearwardly from the top of the transverse bar 1, of the draft frame and being likewise pivotally connected to the bar 1, with the supporting clips or braces 11, by pivot securing bolts 14. Brace members 13$^a$, also extend from the inner ends of the bars 12, of the disk frames to the adjustable draft bars 8, connected to the lever members 5. The disk frame bars 12, are connected to the axle boxes 9, by means of supporting bracket or brace members 15.

The improved scraper blade supporting actuating and adjusting mechanism for the disks comprised in the disk gangs being fully shown and described in the original or parent application hereinbefore referred to, and forming no part of the present divisional application, need not be here described.

As a means of providing an improved foot controlled disk gang leveling or regulating device for use in connection with the draft frame and its connections with the disk gangs and frames, a leveling or snubbing block 16, is interposed between the longitudinally movable and adjustable draft bars 8, leading to the inner ends of the disk gangs and extending from the levers 5, of the draft frame, said leveling or snubbing block 16, in the present instance, being disposed immediately beneath the transverse bar 1, and pivotally attached to the latter by means of bearing brackets 17, said block 16, extending forwardly and, in the present instance, being provided with depending lugs 16$^a$, adapted to frictionally receive and retain the longitudinally movable draft bars 8, as well as form a friction bearing member for the latter in any of their various adjusted positions in angling the disk gangs to the line of draft.

As a means of depressing the forward ends of the leveling or snubbing block 16, and consequently depressing the draft bars 8, and the inner ends of the disk gangs, the forward or free ends of the pivotally mounted block 16, is provided with an upwardly extending foot lever or rack arm 18, whereby the operator or attendant from the seat of the harrow may by the foot, positively depress the foot lever and consequently depress the draft bars through the medium of the lever or tilting movement imparted to the pivoted block 16, and as a means for laterally locking the foot lever in any desired depressed position, a rack engaging lever or dog 19, is pivotally mounted beneath one of the members of the stub pole 3, and extends outwardly and rearwardly at one side of the latter, terminating in an upwardly extending bracket portion 19$^a$, for the convenient operation of the lever or dog in releasing by the foot the toothed portion of the foot lever when desired, and as a means for holding or drawing the free portion of the lever or dog 19, toward the rack arm or lever 18, a spring 20, may be mounted beneath the stub pole 3, and secured to the latter by means of a bolt 20$^a$, as shown most clearly in Fig. 3 of the drawings.

From the foregoing description, taken in connection with the accompanying drawings, the operation and advantages of my invention will be readily understood.

Having thus described one of the embodiments of my invention, what I claim and desire to secure by Letters Patent, is,—

1. In a disk harrow, the combination with the draft frame provided with disk gangs, and adjusting mechanism including draft bars extending beneath said draft frame and leading to said disk gangs; of a pivoted leveling block interposed between said draft frame and said draft bars and provided at its free end with an upwardly extending rack arm and foot lever.

2. In a disk harrow, a draft frame provided with disk gangs, draft bars extending beneath and adjustably connected to said draft frame, a snubbing block pivoted beneath said draft frame above said bars and provided at its free end with a foot lever projecting above said draft frame and adapted to be depressed to depress said snubbing block and said draft bars, and means for securing said foot lever in depressed adjusted position.

3. In a disk harrow, a draft frame provided with disk gangs, gang adjusting mechanism including draft bars extending horizontally beneath said draft frame and connected to said disk gangs, a snubbing block pivoted at one end to said draft frame and extending forwardly above said draft bars, an upwardly extending foot lever carried upon the free end of said snubbing block and extending upwardly above said draft frame, and means for automatically securing said foot lever in depressed adjusted position.

4. In a disk harrow, a draft frame including a stub pole and a transversely extending bar, gang adjusting levers mounted on said stub pole and provided with adjustable draft bars extending beneath said transverse bar, a snubbing block pivotally connected at one end and extending forwardly between said transverse bar and said draft bars, a depressing rack arm carried on the free end of said snubbing block and provided with a foot lever above said stub pole, and a rack engaging member mounted on said stub pole.

5. In a disk harrow, the combination with a draft frame, and adjusting mechanism including draft bars extending beneath said draft frame; of a snubbing block interposed between said draft frame and said draft bars and fulcrumed at one end above said draft bars, said snubbing block being provided at its free end with an upwardly extending foot lever projecting above said draft frame and adapted to be depressed to depress said snubbing block and said draft bars, and means for securing and releasing said foot lever in various adjusted positions.

6. In a disk harrow, a pair of disk gangs and frames, a draft frame including a forwardly extending curved member and a transverse member, draft bars pivotally connected beneath said curved member and extending beneath said transverse member and connected to said disk gangs, said transverse member being provided with stops adapted to coöperate with said draft bars, supporting clips pivotally secured to said draft bars and said draft frame, and brace members secured to the latter coaxially with said supporting clips and connected to said gang frames.

7. In a disk harrow, the combination with a pair of disk gangs and frames, and a draft frame including a transverse bar and a forwardly extending curved draft member; of draft bars pivotally connected to the ends of said curved draft frame member in front of and extending beneath said transverse bar and connected to said disk gangs, supporting clips pivotally secured to said draft bars and said draft frame, and brace members secured to the latter co-axially with said supporting clips and connected to said gang frames.

8. In a disk harrow, a pair of disk gangs and frames, a draft frame including a transverse bar provided near its ends with depending stop members and a curved draft frame member extending forwardly from the ends of said transverse bar, draft bars pivotally connected to said draft frame and extending beneath said transverse bar in coöperative relation to said depending stop members, supporting members pivotally secured to said draft and transverse bars and adapted to hold the same in fixed horizontal relation to each other, and brace members pivotally secured to said draft frame and said gang frames.

9. In a disk harrow, the combination with a draft frame provided with disk gangs, adjusting levers mounted thereon and provided with draft bars extending beneath said draft frame and connected to the inner ends of said disk gangs; of a snubbing block interposed between said draft frame and said draft bars said block being pivotally connected at its rear end to said draft frame, an upwardly projecting foot lever connected to the free end of said snubbing block and adapted to be depressed to depress said snubbing block and said draft bars, and means for securing said foot lever in adjusted position.

10. A disk harrow, comprising disk gangs and frames, a draft frame including a transversely extending bar and a forwardly extending curved member having its ends attached to said transverse bar, a stub pole attached to said transverse bar and the forwardly curved portion of said curved member, draft bars pivotally connected to the ends of said curved member and extending beneath said transverse bar to said disk gangs, supporting clips pivotally secured to said draft frame and to said draft bars at the rear of said transverse bar the latter being provided on its under side with stop shoulders adapted to limit the movements of said draft bars, and brace members pivotally secured to said draft frame and connected to said gang frames.

In testimony whereof I have affixed my signature in presence of two witnesses.

FREDERICK C. WARNE.

Witnesses:
A. C. RHOADS,
N. P. HENRY, Jr.

Copies of this patent may be obtained for five cents each, by addressing the "Commissioner of Patents, Washington, D. C."